United States Patent [19]
Sato

[11] 3,986,518
[45] Oct. 19, 1976

[54] WORK ARTICLE HANDLING SYSTEM IN SURFACE TREATMENT APPARATUS

[75] Inventor: Tasuke Sato, Narashino, Japan

[73] Assignee: Toyo Giken Kogyo Kabushiki Kaisha, Tokyo, Japan

[22] Filed: Nov. 24, 1975

[21] Appl. No.: 634,698

[52] U.S. Cl. .............................. 134/57 R; 134/76; 118/6; 118/425
[51] Int. Cl.² ......................................... B08B 3/04
[58] Field of Search ................. 134/57 R, 58 R, 76, 134/77; 118/6, 425

[56] References Cited
UNITED STATES PATENTS

| | | | |
|---|---|---|---|
| 2,048,937 | 7/1936 | Larson | 134/76 UX |
| 2,772,523 | 12/1956 | Ruthner | 134/76 |
| 3,601,134 | 8/1971 | Benjamin | 134/76 X |
| 3,691,988 | 9/1972 | Clarke | 118/6 |
| 3,807,353 | 4/1974 | Kobernick | 118/6 X |
| 3,869,313 | 3/1975 | Jones et al. | 134/76 X |
| 3,888,270 | 6/1975 | Crapet | 134/57 R |
| 3,903,908 | 9/1975 | Logue et al. | 134/57 R |

FOREIGN PATENTS OR APPLICATIONS

| | | | |
|---|---|---|---|
| 110,858 | 5/1964 | Czechoslovakia | 134/58 R |
| 805,214 | 5/1951 | Germany | 134/76 |

*Primary Examiner*—Robert L. Bleutge
*Attorney, Agent, or Firm*—Ladas, Parry, Von Gehr, Goldsmith & Deschamps

[57] ABSTRACT

In a metal surface treatment apparatus in which a work article is immersed successively in a plurality of treatment tanks disposed in a line and containing respective treatment liquors, a traveling crane handling the work article in this operation is automatically controlled to travel over the tanks with a repeated horizontal speed pattern comprising an initial period of steady acceleration from the center of each tank, a period of high speed, and a period of deceleration upon approaching the center of the succeeding tank, at which the crane is stopped, and is automatically controlled to lower and raise the work article at the center of each tank with a vertical speed pattern comprising, in sequence, an initial period of descent at low speed, a period of high speed, a period of low speed as the lower end of the article approaches and enters the surface of the treatment liquor in the tank, a period of high speed, a period of low speed as the article approaches the lower limit of its descent, an initial period of ascent at low speed, a period of high speed, and a period of low speed as the article approaches the upper limit of its travel.

3 Claims, 9 Drawing Figures

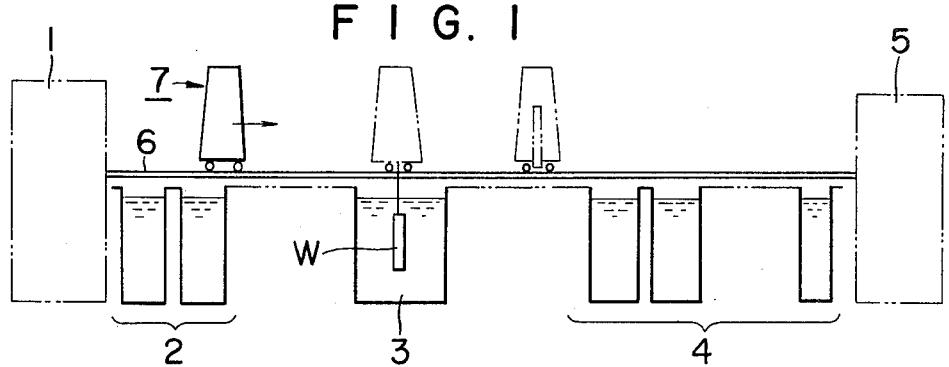
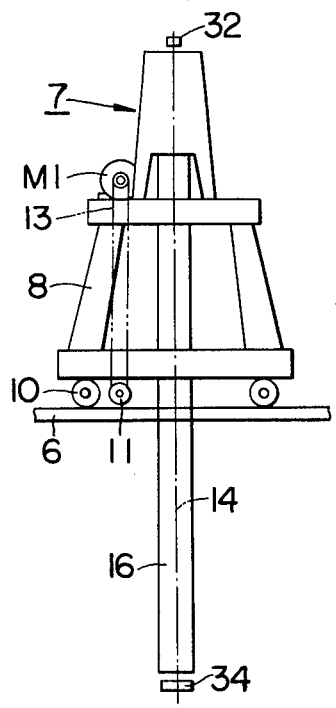
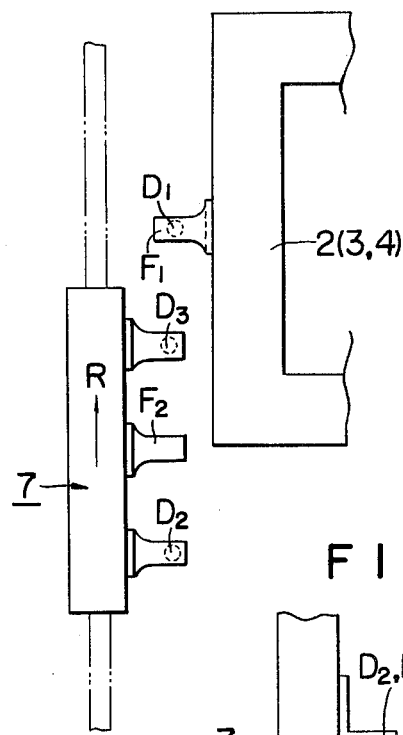
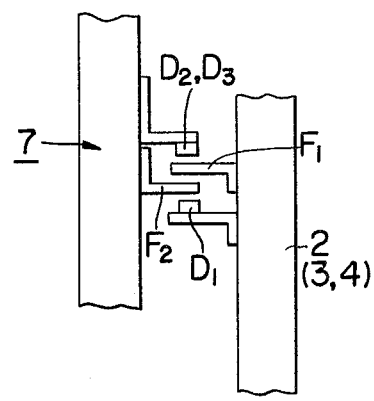

WORK ARTICLE HANDLING SYSTEM IN SURFACE TREATMENT APPARATUS

BACKGROUND OF THE INVENTION

This invention relates to surface treatment apparatuses and work carrying and handling systems thereof and more particularly to a handling system for conveying, lowering, and raising work articles being treated in metal surface treatment.

Metal surfaces of work articles are ordinarily subjected to a series of treatments in a batch type metal surface treatment apparatus which comprises a plurality of treatment liquid tanks arranged in a line for carrying out respectively different surface treatments and means for moving from one tank to the succeeding tank a conveying frame from which is suspended each work article to be treated and dipping the article in each tank in succession from the starting end to the terminal end of the line thereby to subject the article to each of the treatments.

In a handling system for accomplishing a carrying and handling operation of this character, conditions peculiar to surface treatment, in addition to the conditions to be met in a handling system for general industrial use, must be satisfied. Otherwise, there will arise not only problems in the handling of the work articles being treated but also problems due to adverse effect on the performance of the surface treatment.

More specifically, these conditions are related to the mutual relationship of the treatment tanks and the work articles to be treated (hereinafter referred to as articles), swinging of an article, prevention of deterioration of the electrical characteristics of a conveying frame and an article, prevention of an oblique entrance phenomenon when an article is plunged into a treatment liquor, shockless setting of a conveying frame on a conveying frame seat, reduction of the handling time, and reduction of driving power consumption.

SUMMARY OF THE INVENTION

It is an object of this invention to provide a work handling system in a surface treatment apparatus, which handling system satisfies all of the required conditions set forth above and has improved mechanical and electrical performance and high stability.

In accordance with this invention, briefly summarized, there is provided, in a surface treatment apparatus wherein a work article is immersed successively in a plurality of tanks disposed in a line and containing respective treatment liquors, and a traveling crane having a hoist mechanism for lowering and raising the article travels along the line of the tanks, a detection and control system operating to detect horizontal positions of the crane relative to the tanks and height positions of the article and thereby to send command signals to motor control devices respectively for controlling motors for driving the crane in travel and the hoist mechanism, whereby the crane travels with periods of steady acceleration and deceleration at the start and finish of its travel between the centers of two tanks with a period of high speed therebetween, and the article is lowered and raised with initial and terminal periods of low speed, periods of low speed as the lower end of the article approaches and enters the treatment liquor of each tank and as the article approaches the lower limit of its descent, and periods of high speed interposed between the periods of low speed.

The nature, principles, and utility of this invention will be more clearly apparent from the following detailed description with respect to a preferred embodiment of the invention when read in conjunction with the accompanying drawings, briefly described below, throughout which like parts are designated by like reference numerals and characters.

BRIEF DESCRIPTION OF THE DRAWINGS

In the drawings:

FIG. 1 is a diagrammatic side elevation showing the general organization of a metal surface treatment apparatus in which an example of the work article handling system according to this invention is incorporated;

FIG. 3 is a side elevation of the traveling crane illustrated in FIG. 2;

FIGS. 4 and 5 are respectively plan and elevational views showing relationships between detectors and detectable objects mounted on the crane and a treatment tank;

DETAILED DESCRIPTION OF THE PREFERRED EMBODIMENTS

Figure 2:
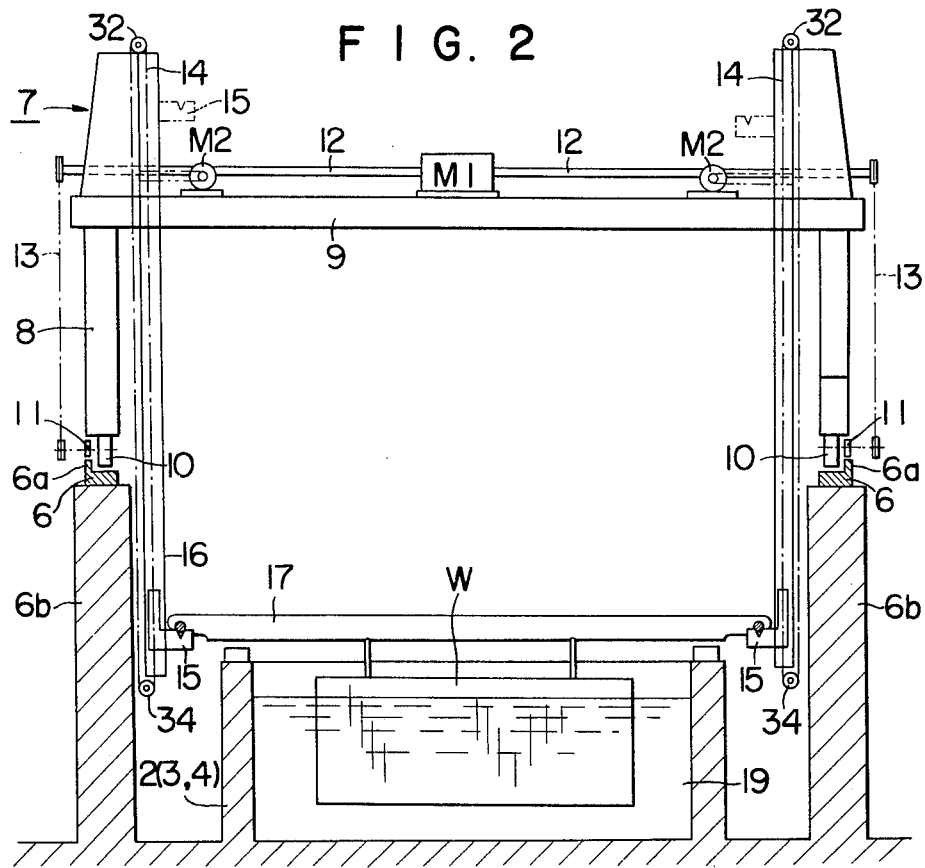
FIG. 2 is an elevation, partly in cross section taken transversely through one of the treatment tanks in the apparatus illustrated in FIG. 1, showing a traveling crane hoisting an article in suspended state partly in a treatment liquor.

Referring first to FIG. 1 diagrammatically illustrating a metal surface treatment apparatus in which the article handling system according to this invention is incorporated, there is provided a line of treatment tanks comprising pretreatment tanks 2, an anodic oxidation treatment tank 3, and after-treatment tanks 4 arranged in the sequence named from a so-called "stockyard" or storage place 1 at the starting end of the line to another storage place 5 at the terminal end of the line. A pair of parallel rails 6 are provided along the two sides of the line of tanks, as described hereinafter. These rails 6 are provided with rack teeth 6a on their laterally outer sides as shown in FIG. 2. A racking station is also provided in the storage place 1, while an unracking station is provided in the storage place 5 downstream from the after-treatment tanks 4.

The rails 6 are bedded on raised support bases 6b and constitute a railway for travel therealong of a traveling crane 7 of gantry crane type, whose structure comprises left and right upright side frames 8 and a bridge or cross beam 9 rigidly fixed at its ends respectively to the side frames 8 as shown in FIGS. 2 and 3. The side frames 8 are provided at their lower parts with pairs of rollers 10 adapted to roll along their respective rails 6 and pinions 11 for engaging with the rack teeth 6a. The pinions 11 are driven by power transmitted from a motor $M_1$ mounted on the cross beam 9 through a drive shaft 12 and sprocket and chain mechanisms 13. The cross beam 9 are provided thereon with respective hoisting motors $M_2$ adapted to drive endless hoist chains 14.

The hoist chains 14 are adapted to raise and lower respective so-called "buckets" of hooks 15 which are free to travel vertically along respective guides 16. A conveying frame 17 disposed transversely is supported at its ends on respective hooks 15 and is thereby raised and lowered. This conveying frame 17 is used to convey an article W suspended therefrom and to lower and raise the article into and out of each of the tanks 2 (3, or 4) containing a treatment liquor 19.

Figure 9:
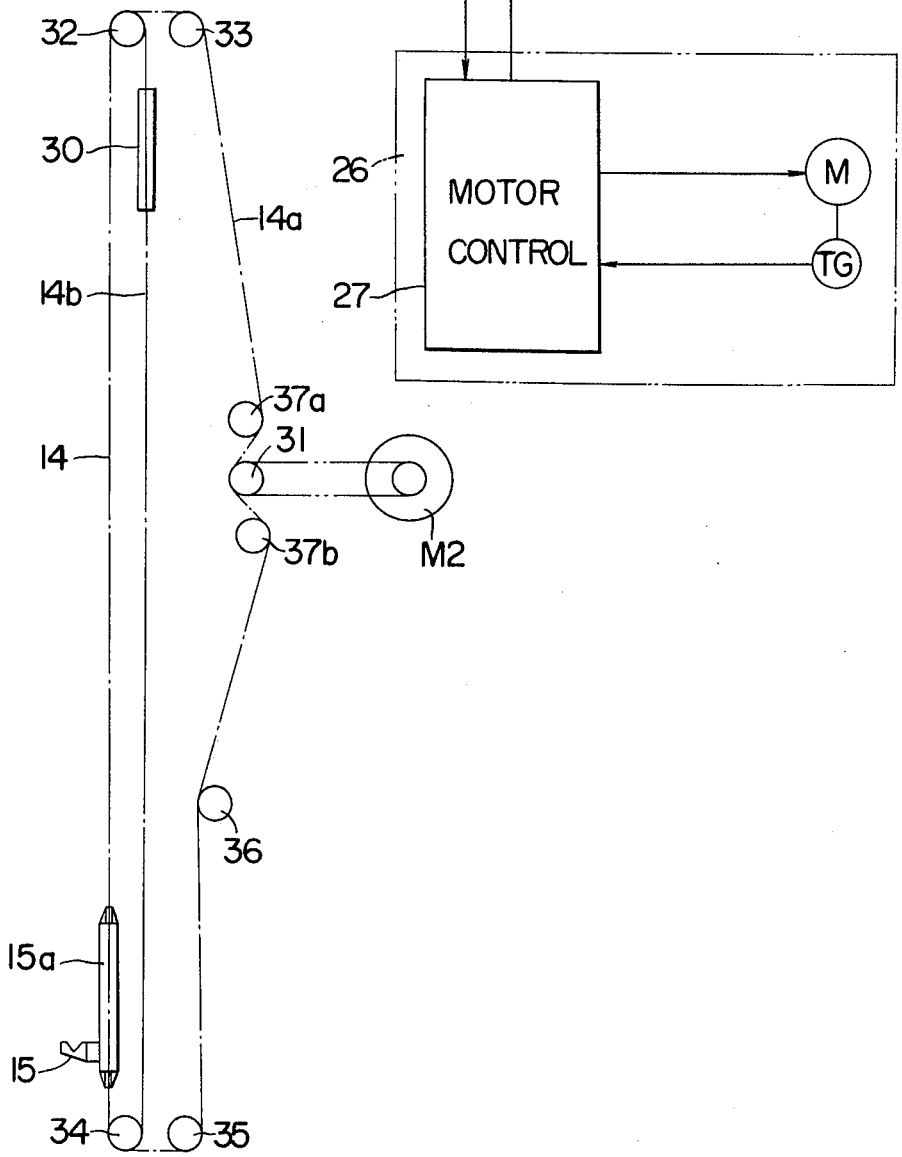
FIG. 9 is a diagrammatic elevation showing the essential organization of one example of a hoist chain mechanism which is installed on each side of a gantry type crane for raising and lowering the article to be treated, and which is provided with a counterbalancing weight.

While the chain hoist mechanism thus installed on the crane 7 may be of any design suitable for its purpose, it is preferably of an organization wherein one or more counterbalancing weights are utilized to counterbalance at least some of the weight of the conveying frame 17 and the article W suspended therefrom in order to reduce the power required for raising the frame and article. One example of such an arrangement is diagrammatically illustrated in FIG. 9, in which the mechanism on only one side of the crane is shown. The "bucket" or hook 15 projects inward from and is a part of a member 15a fixed to the hoist chain 14, which in this case comprises two endless chains 14a and 14b.

The chain 14a extends upward from the hoist support 15, passes over upper roller pulleys 32 and 33, extends to a driving sprocket 31 interposed between flanking guide roller pulleys 37a and 37b and driven by the motor $M_2$, extends further downward past a guide roller pulley 36, passes around lower roller pulleys 35 and 34, and extends upward to the hoist support 15. The chain 14b extends upward from the hook 15, passes around an upper roller pulley 32, extends downward to a balance weight 30, to which it is fixed, extends downward, passes around a lower roller pulley 34, and extends upward to the hook 15. The balance weight 30 is secured to the chain 14b at a position thereof such that the two spans of the chain between the weight 30 and the hook 15 are substantially equal.

Figure 6:
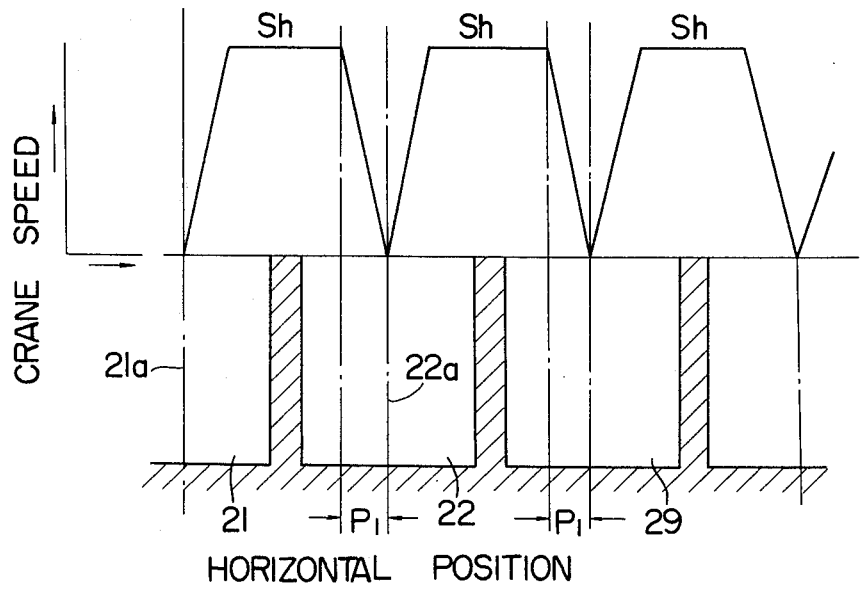
FIG. 6 is a graphical representation indicating the crane travel speed at various points in the crane travel path.

In accordance with this invention, the crane 7 travels along the rails 6 in a manner as indicated in FIG. 6, which shows a graphical time-speed representation. When the travel drive mechanism, including the motor $M_1$, of the crane 7 stopped in a position where the center of its guides 16 coincides with center 21a of a forward or upstream tank 21 receives a travel command, this mechanism is activated. The crane thereupon travels downstream with a predetermined acceleration ds/dt for a preset time, during which the traveling speed rises until a maximum speed Sh is attained, and travels at this speed Sh until its passage past a specific point upstream from the center 22a of the succeeding tank 22 is detected by a detector installed at a part of the tank or some other fixed structure as described hereinafter. This detection results in a deceleration command sent to the crane travel drive mechanism, whereupon the crane decelerates at a deceleration − ds/dt and is stopped by the operation of a detector disposed near the center of this tank 22.

Control of this travel of the crane 7 can be accomplished by detector means, an example of which is illustrated in FIGS. 4 and 5. It is assumed that the crane 7 is traveling in the direction R relative to a tank 2 (3 or 4). A detector $D_1$ and a detectable object $F_1$ are fixed to the tank, while detectors $D_2$ and $D_3$ and a detectable object $F_2$ are fixed to the crane at relative positions as shown in FIGS. 4 and 5. These detectors $D_1$, $D_2$, and $D_3$ and detectable objects $F_1$ and $F_2$ operate cooperatively in the following manner.

1. When the detector $D_3$ detects the object $F_1$, it sends a deceleration command to the control device of the travel motor $M_1$ of the crane 7, whereupon the crane decelerates in traveling in the direction R.

2. Then, when the detector $D_1$ detects the object $F_2$, it sends a stop command to the same motor control device.

The precision of this operation of stopping the traveling crane 7 relative to the tank 2 (3 or 4) depends on several factors such as the magnitude of the momentum of the crane 7, the conveying frame 17, and the work article W due to the masses thereof, whereby it is difficult to calculate quantitatively with accuracy the particulars of the detection system. The positions of the detectors and detectable objects are adjusted at the time of trial runs. In the case of travel in the reverse direction, the detector $D_2$ operates in place of the detector $D_3$.

The detectors may be proximity switches, for which iron plates are used as detectable objects. While either the detectors or the detectable objects may be installed on suitable parts of either the crane 7 or the treatment tanks, the mounting of the detectors, except for one detector, on the crane is considered to be preferable for the following reason. By this arrangement, fewer detectors are required, and, moreover, since the motor control systems for the crane traveling motor and for the hoist chain motors are mounted on the crane, the wiring of the detector lead lines and signal cables and interrelations between the control systems become simpler. The reason for mounting one detector on each treatment tank is that this facilitates the determination at a central control station of the identity of the tank at which the crane is operating.

By this arrangement, the number of logical circuits can be greatly reduced in comparison with that required when three detectors are mounted on either the crane or each of the tanks. If three detectors were to be mounted on each of the tanks, the length of cables would increase and give rise to deleterious effects due to noise.

Figure 8:
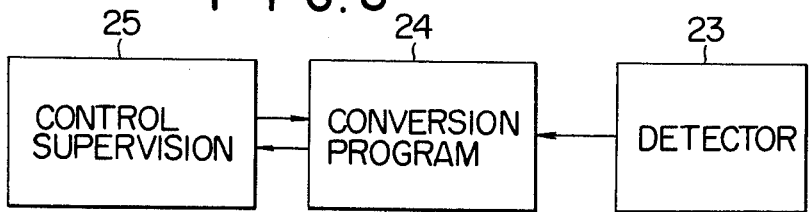
FIG. 8 is a block diagram of an example of a motor control system in the handling system of this invention.

Starting of the crane travel is initiated from a control station 25 as shown in FIG. 8. The motor $M_1$ is rotated (moving the crane) under a low-speed starting condition. In this case, however, because of time delay due to acceleration of the crane 7, conveying frame 17, and other large-mass structures and the delay of a feedback signal relative to an input signal, the speed increases as ds/dt up to the low-speed starting.

The period of this low-speed starting is variable within a motor control 27 and is set for smooth transition to high speed. At the end of this low-speed starting period, the control is automatically switched to high speed. In FIG. 8, the components within the chain-line enclosure 26 are installed on the crane 7.

When, during the high-speed running, a deceleration command is received (i.e., a low-speed switching command due to detection of the object $F_1$ by the detector $D_3$), the control is changed over to low speed. In this case, the crane 7 is decelerated with a reversal of the operation described above.

The detection output signals of the above described detectors such as $D_3$ are passed through conversion means 24, where they are subjected to operations such as signal matching, and are then applied to the motor control station 27. When the detector $D_1$ registers with the object $F_2$, it stops the motor $M_1$. Information such as the identity of the tank at which the crane is positioned is detected by the detector $D_1$ and the resulting signal is sent by way of the conversion means 24 to be indicated at the control station 25.

Figure 7:
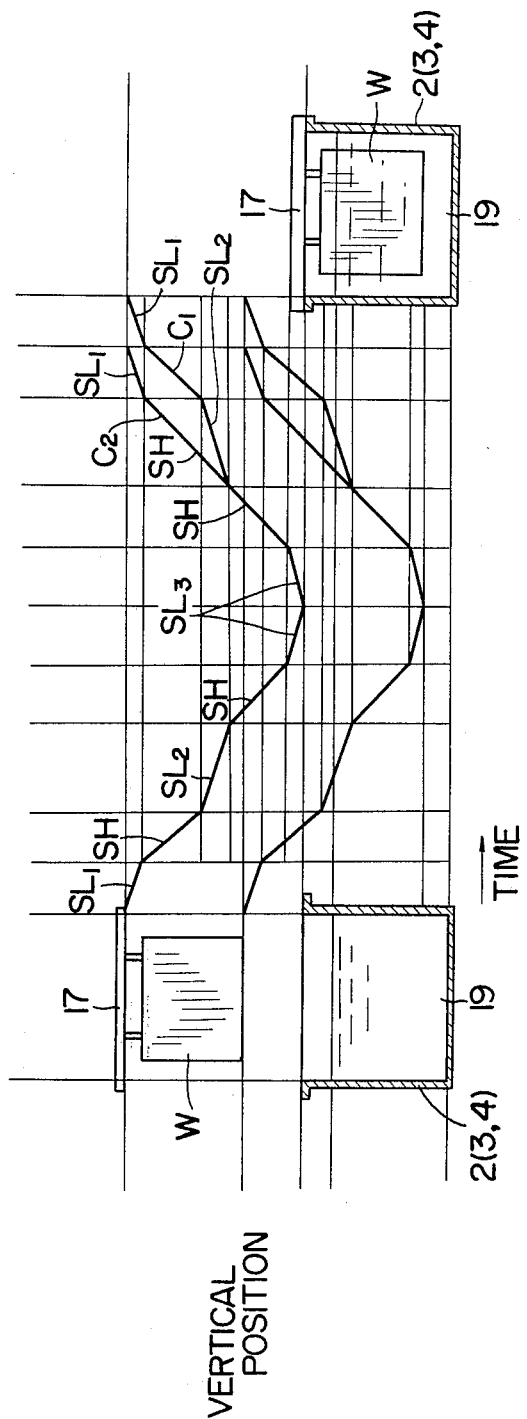
FIG. 7 is a graphical representation indicating the variations with time of vertical positions of a conveying frame and of the lower part of an article suspended therefrom.

The manner in which the crane 7 is operated in raising and lowering the conveying frame 17 and the work article W is indicated graphically in FIG. 7. The diagrammatic elevational view at the left-hand side shows the state of the conveying frame 17 and the work article W relative to a tank 2 (3 or 4) corresponding to the upper limit of the position of the aforementioned hooks 15, while the view at the right-hand side shows that corresponding to the lower limit of the position of the hooks 15, that is, the state wherein the conveying frame 17 is resting on the conveying frame seat 28 at the upper part of the tank.

When descending from their upper-limit position, the hooks 15 first start at a low speed $S_{L1}$. Then, at a specific instant, the hooks 15 shift to a high speed $S_H$, at which they descend until the lower part of the work article W plunges into the treatment liquor 19, whereupon the speed is shifted to a low speed $S_{L2}$. Then, at another specific instant, the speed is increased again to $S_H$. At an instant somewhat before the conveying frame 17 contacts the conveying frame seat 28, the speed is again lowered to $S_{L3}$.

The speeds at which the hooks 15 are raised may be of a characteristic representable by a curve $C_1$ which is symmetrically opposite the descent curve with respect to the ordinate $C_3$ corresponding to the lower limit position of the hooks 15 as a centerline as indicated by curve $C_1$. Alternatively, the ascending speed may be a low speed $S_{L3}$ and low speed $SL_1$ respectively at the start and end of the ascent, the speed therebetween being the high speed $S_H$ as indicated by curve $C_2$.

A detection and control system similar to that described hereinbefore with reference to FIG. 8 and with respect to control of the horizontal travel of the crane can be used also for control of the hoisting motors $M_2$. In the case of the control system for the crane travel motor $M_1$, the motor control operates in response to a command from the control station 25 to activate the motor $M_1$, and a tachogenerator TG coupled directly to the motor $M_1$ generates a signal, which is fed back to the motor control. Thus, rotational control is effected with a closed loop.

As mentioned above, the organization of the control system for controlling the hoisting mechanism can be similar to that for controlling crane travel. However, if the left and right hooks 15 are driven by separate motors $M_2$ controlled by respectively separate control systems, the work article W can be hoisted with a cant angle. This feature is convenient for draining off the treatment liquor adhering to the article particularly when the article is suspended with its longer side is in the transverse direction.

The combined operation of the travel of the crane 7, including the conveying frame 17 from which the article W is suspended, from tank 22 to the succeeding tank 29 in FIG. 6 and the raising and lowering of the conveying frame 17 will now be described in detail.

The crane 7 which has hoisted the conveying frame 17 and article W out of the tank 22 travels toward tank 29 and reaches a point upstream by a distance $P_1$ from its stopping position at the tank 29, whereupon a detector installed at the point sends a detection signal, which results in a deceleration command being sent to the motor control for the travel motor $M_1$. The crane 7 thereby decelerates at $- ds/dt$. The purpose of this deceleration is to prevent the work article W suspended from the conveying frame 17 from swinging when the crane 7 is stopped.

If swinging of the article W occurs, the article cannot be immersed smoothly without splashing into the treatment liquor 19 and is apt to damage the accessory parts of the tank. Furthermore, the article W is suspended from the conveying frame 17 by a procedure called racking, that is, by being held by clamping by a clamping jig which is fixed to or hung from the conveying frame 17 and is pulled off the clamping jig after treatment by a procedure called unracking. In order to facilitate the racking and unracking procedures, the clamping jig is made as simple as possible. Consequently, if the article W undergoes a motion such as swinging, it will drop off or will slip and be displaced to an undersirable position relative to the conveying frame 17. This slipping results in a reduction of the area of contact between the clamping jig and the article W and, in some cases, in failure to accomplish the specified treatment because of reduced area for electrical conduction.

Accordingly, in order to prevent swinging, it must be possible to absorb the momentum of the article W generated in the travel time Sh. That is, since this momentum differs with factors such as the length of the article W from the clamping jig and the frictional resistance between the pinions 11 and the rack teeth 6a, the aforementioned detector $D_1$ is mounted in a manner such that the distance $P_1$ will be variable, also for increasing the accuracy of the stopping action at the correct stopping position. Then, as the crane 7 travels further, and the detector $D_2$ detects the object $F_1$, the crane travel stops. At this time, the centers of the hooks 15 are coincident with the center of the tank 22.

Next, in order to immerse the article W in the treatment liquor in the tank 22, the hoist driving motors $M_2$ are operated to lower the conveying frame 17 and the article W suspended therefrom. This lowering action will be described with reference to FIG. 7 and with respect to the conveying frame 17 supported on the hooks 15.

In order to prevent application of impact to the article W, the frame 17 is initially lowered at the aforementioned low speed $S_{L1}$ for a predetermined period, after which it is lowered at a high speed $S_H$. Then, as the lower end of the article W approaches the surface of the treatment liquor, this state is detected by a detector (not shown), which generates a signal by which the lowering speed is changed over to a slow speed $S_{L2}$. The purpose of this reduction in lowering speed is to prevent the article W from sinking obliquely into the liquor, instead of entering thereinto along a straight path, because of the great liquid resistance acting on the article lowered at high speed. If the article were to enter and sink obliquely through the treatment liquor there would be the risk of its colliding with and damaging accessory parts within the tank.

While detectors for detecting positions for other purposes may be of mechanical type or electrical type a photoelectric detector is suitable for the instant purpose in consideration of the length of the article W.

Then, after a specific period, the lowering speed of the conveying frame 17 is again changed over to the high speed $S_H$.

When the conveying frame 17 approaches the upper surface of the conveying frame seat 28 of the tank, a detector detects this state and generates a detection signal by which the lowering speed is again changed to a slow speed $S_{L3}$. The purpose of this speed reduction is to prevent the article W from dropping off from the conveying frame 17 when the frame contacts the frame seat 28.

Then, upon completion of the specified treatment in the tank 22, the article W is raised and transferred to the succeeding tank 29. This raising is started at a slow speed $S_{L3}$ so as to prevent the article W from dropping off from the conveying frame 17. Thereafter, the article may be raised in a manner which is the reverse of that of the lowering or it may be raised at a high speed $S_H$ until the frame 17 approaches the upper limit of its vertical travel. In either case, when the upper limit of travel is approached, the raising speed is changed to a slow speed so as to prevent the article W from fulling off. When the frame 17 reaches it upper limit of its vertical travel, the crane 7 begins traveling with an acceleration ds/dt toward the succeeding tank 29.

Thus, by providing a metal surface treatment apparatus of batch type with a work handling system of optimum control and operational characteristics as described above, it becomes possible to accomplish prescribed handling operations of conveying and dipping of the work article without subjecting it to impact, whereby the following beneficial results are afforded.

1. The precision in stopping the crane at the intend points is increased.
2. Reduction in the size of the electrically conductive parts of the conveying frame 17 and of the article W and dropping off the article do not occur.
3. When the article is introduced into the treatment liquor, there is no oblique movement of the article.
4. There is no swinging of the article at both the start and finish of the crane travel.

As an ultimate result of these desirable features of this invention, an excellent finish is obtained on the treated article.

I claim:

1. In a surface treatment apparatus wherein a work article is immersed successively in a plurality of treatment tanks arranged in a sequence and containing respective treatment liquors thereby to subject the article to successive surface treatments, the combination therewith of a work handling system comprising:

a crane traveling way laid out along said sequence of tanks;

a traveling crane adapted to travel along the crane traveling way and having a hoist mechanism for raising and lowering the article out of and into each of the tanks, a travel motor for driving the crane along the traveling way, at least one hoist motor for driving the hoist mechanism, and a motor control device operating in response to command signals to controllable operate each motor; and a control system for controlling said travel and hoist motors in a manner such that the crane is driven to undergo a travel with a repeated horizontal speed pattern comprising, in sequence, a specific period of steady acceleration starting from the center of each tank to a high speed, a specific period of travel at the high speed, and a period of steady deceleration terminating at zero speed at the center of the succeeding tank, and in a manner such that the hoist mechanism is driven to lower the article with a vertical speed pattern comprising, in sequence, an initial period of low speed, a period of high speed until the lower end of the article approaches the surface of the treatment liquor in said tank, a period of low speed until the lower end of the article has entered the liquor, a period of high speed until the lower limit of descent of the article is approached, and then a period of low speed until said lower limit is reached and to raise the article with a vertical speed pattern comprising at least an initial period of low speed, a period of high speed until the upper limit of ascent of the article is approached, and then a period of low speed until said upper limit is reached.

2. A work handling system as claimed in claim 1 in which said control system comprises:

a crane travel control system comprising first detecting means for detecting positions of the crane relative to the tanks and thereby generating corresponding first detection signals, first control means operable by an operator to generate first supervisory signals, and first conversion means operating in response to each first detection signal and first supervisory signal to send a corresponding command signal to the motor control device of the travel motor; and a hoist mechanism control system comprising second detecting means for detecting height positions of the article and thereby generating corresponding second detection signals, second control means operable by the operator to generate second supervisory signals, and second conversion means operating in response to each second detection signal and second supervisory to send a corresponding command signal to the motor control device of said at least one hoist motor.

3. A work handling system as claimed in claim 2 in which: the crane traveling way comprises rails laid on opposite sides of the tanks aligned in a line; the traveling crane is of gantry type having a transverse conveying frame supported at its ends by hoist supports connected to respective endless hoist chains driven by hoist motors; the crane travel motor, the hoist motors, and the motor control device are mounted on the crane; and the detection and control system includes a first detector fixed to a stationary object in the vicinity of the center of each tank, second and third detectors mounted on a part of the crane, a first detectable object fixed to said stationary object in the vicinity of the center of each tank, and a second detectable object mounted on a part of the crane, the third detector sending a detection signal upon detection of the first detectable object to cause a deceleration command to be sent the motor control device of the travel motor, the first detector sending a detection signal upon detection of the second detectable object to cause a stop command to be sent to said motor control device, the second detector operating in place of the third detector in the case of crane travel in the reverse direction.

* * * * *